July 17, 1923.
B. F. SEYMOUR
RESILIENT TRANSMISSION
Filed June 7, 1919
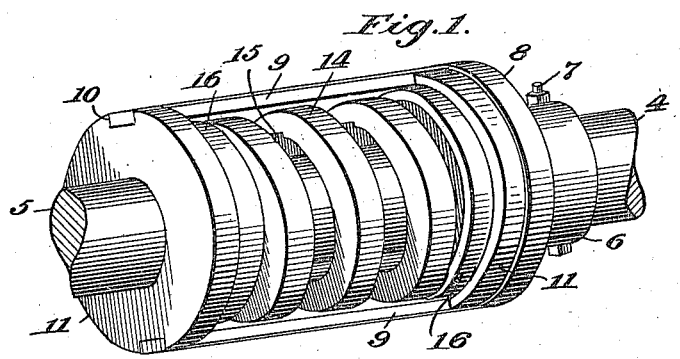
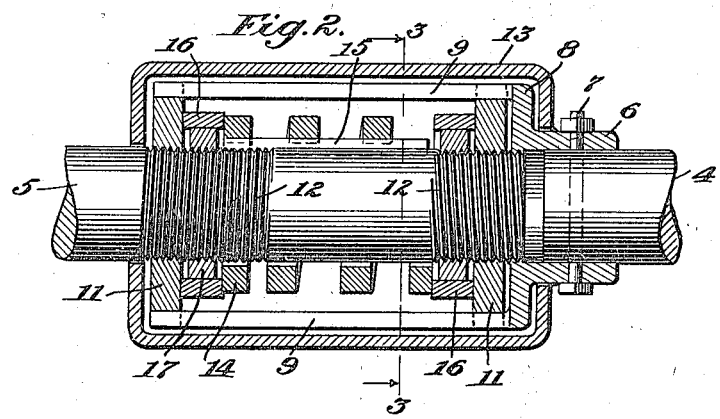
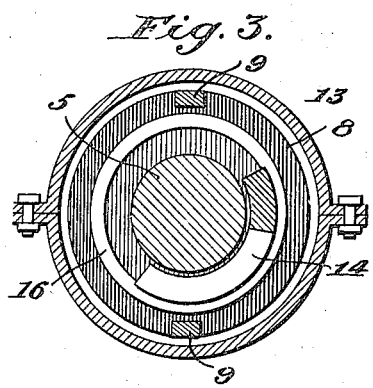
Inventor:
B. F. Seymour,
Atty.

Patented July 17, 1923.

1,462,383

UNITED STATES PATENT OFFICE.

BENJAMIN F. SEYMOUR, OF WASHINGTON, DISTRICT OF COLUMBIA.

RESILIENT TRANSMISSION.

Application filed June 7, 1919. Serial No. 302,413.

*To all whom it may concern:*

Be it known that I, BENJAMIN F. SEYMOUR, a citizen of the United States, residing at Washington, in the District of Columbia, have invented certain new and useful Improvements in Resilient Transmissions; and I do hereby declare the following to be a full, clear, and exact description of the invention, such as will enable others skilled in the art to which it appertains to make and use the same.

The present invention relates to resilient transmissions and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

The invention is shown by way of illustration in the accompanying drawings wherein Fig. 1 is a perspective view of the transmission.

Fig. 2 a longitudinal sectional view thereof.

Fig. 3 a transverse sectional view taken on the line 3—3 of Fig. 2.

Referring to the construction in further detail and wherein like reference characters designate corresponding parts, the construction consists of a driving element or shaft 4 and a driven element or shaft 5 connected to the driving element 4 through the resilient transmission.

The resilient transmission per se consists of a collar 6 secured to the shaft 4 by the bolt 7, or by other means, and having a flanged portion 8 that carries a pair of arms or reach rods 9 as shown. Said rods 9 engage respectively within notches 10 formed in the pair of collars 11 which are screw mounted in opposite directions on the threads 12 formed on the driven shaft 5. A suitable casing 13 is mounted on the collar 6 and effectively closes and conceals all working parts of the transmission.

The flexible element per se comprises a spring 14 fitted about the shaft 5 between the thread portions 12 thereof and said spring is held against rotation with respect to the shaft by the key or spline 15 as shown in Fig. 2. Said spring has its respective ends abutting against the pair of rings 16 that are centrally mounted on the shaft by means of the pair of collars 17 that screw on oppositely pitched threads 12.

It will therefore be seen from the foregoing that any turning of the shaft 4 will transmit a like movement to the shaft 5 through the medium of the two arms 9 that operate to compress the spring and effect the driving action.

It will be obvious, of course, that different forms of construction may be provided in lieu of that disclosed and described herein. And while I have shown and described certain apparatus for accomplishing the result initially stated it is to be understood that I am not limited to the precise details shown but may on the other hand adopt such modifications or changes within the scope of the claims to better suit the end in view.

Having thus described my invention, what I claim is:

1. In a resilient shaft transmission, the combination of a driving element, a driven element, a spring associated with one of said elements, oppositely adjustable collars for tensioning the spring, and means connected with the other of said elements for actuating said adjustable collars, substantially as set forth.

2. In a resilient shaft transmission, the combination of a driving element, a driven element, compressible collars screw threaded on one of said elements, a spring located between said collars, and means carried by the other element for actuating said collars to compress the spring and effect transmission, substantially as set forth.

3. In a resilient shaft transmission, the combination of a driving element, a driven element, a spring mounted on the driven element and providing driving connection between said elements, a pair of collars oppositely adjustable on the driven element and co-operable to tension said spring to effect driving connection between said elements, and means carried by the driving element engaging with and operable to actuate said adjustable collars, substantially as set forth.

4. In a resilient shaft transmission, the combination of a driving element, a driven element, a spring mounted on the driven element for effecting driving connections between said elements, a pair of collars oppositely screw-threaded on the driven element cooperable to compress said spring to effect driving connection, said collars provided with notches; and means carried by the driving element engaging said notched collars and operable to actuate the same to compress the spring and effect driving connection, substantially as set forth.

In testimony whereof I affix my signature.

BENJAMIN F. SEYMOUR.